United States Patent [19]

Chombard

[11] 4,094,200
[45] June 13, 1978

[54] METHOD AND EQUIPMENT FOR MAKING ROLL AND PITCH DATA INPUTS INTO A PILOTING INSTRUMENT

[75] Inventor: Pierre Andre Chombard, Boulogne-sur-Seine, France

[73] Assignee: Societe Francaise d'Equipements pour la Navigation Aerienne S.F.E.N.A., Velizy-Villacoublay, France

[21] Appl. No.: 620,218

[22] Filed: Oct. 6, 1975

Related U.S. Application Data

[63] Continuation-in-part of Ser. No. 448,022, Mar. 4, 1974, abandoned.

[30] Foreign Application Priority Data

Mar. 5, 1973 France .................................. 73 07784
Oct. 7, 1974 France .................................. 74 33661

[51] Int. Cl.² ...................... G01C 19/02; G01C 19/00; G08G 5/00
[52] U.S. Cl. ...................................... 74/5 R; 74/5.34; 73/178 R; 33/330; 340/27 AT; 340/27 NA
[58] Field of Search ................. 74/5.34, 5 R; 73/178; 33/328, 329, 330; 340/27 AT, 27 NA

[56] References Cited

U.S. PATENT DOCUMENTS

| | | | |
|---|---|---|---|
| 2,620,669 | 12/1952 | Braddon | 74/5.34 X |
| 2,696,597 | 12/1954 | Chombard | 33/330 X |
| 2,752,792 | 7/1956 | Draper et al. | 74/5.34 |
| 2,796,594 | 6/1957 | Chombard | 340/27 AT |
| 2,892,180 | 6/1959 | Smith | 340/27 NA |
| 2,898,766 | 8/1959 | Pittman | 74/5.34 |
| 2,949,780 | 8/1960 | Williams | 74/5.34 X |
| 3,015,962 | 1/1962 | Wrigley et al. | 33/328 |
| 3,213,416 | 10/1965 | Joline | 73/178 X |
| 3,263,646 | 8/1966 | Arnold et al. | 33/330 X |
| 3,404,571 | 10/1968 | Schlitt | 74/5.34 |
| 3,451,275 | 6/1969 | Atkin | 74/5.34 |
| 3,490,281 | 1/1970 | Ainsworth | 73/178 R |
| 3,521,597 | 7/1970 | Chombard | 73/178 X |

FOREIGN PATENT DOCUMENTS

| | | | |
|---|---|---|---|
| 1,336,058 | 7/1963 | France | 33/329 |
| 2,116,885 | 10/1971 | Germany | 73/178 R |
| 777,818 | 6/1957 | United Kingdom | 33/328 |
| 882,321 | 11/1961 | United Kingdom | 33/328 |

OTHER PUBLICATIONS

F. Postlethwaite, "An Italian Artificial Horizon"-Aircraft Engineering Magazine, Oct., 1944, pp. 288-289.

*Primary Examiner*—Samuel Scott
*Assistant Examiner*—Don E. Ferrell
*Attorney, Agent, or Firm*—Karl W. Flocks

[57] ABSTRACT

In a gyro horizon type of equipment, roll corrections are fed to the aircraft symbol which is a normally fixed display element and pitch correction is introduced on a movable display element or drum with modification of the position of the display elements of the instrument gyro as a function of an interconnection of the instrument gyro with a gyromaster reference through comparators connected to each of the roll and pitch systems.

13 Claims, 2 Drawing Figures

METHOD AND EQUIPMENT FOR MAKING ROLL AND PITCH DATA INPUTS INTO A PILOTING INSTRUMENT

This application is a continuation-in-part application of U.S. application Ser. No. 448,022, now abandoned of Pierre Andre Chombard filed Mar. 4, 1974.

BACKGROUND OF THE INVENTION

The present invention deals with a method and equipment for introducing pitch and roll attitude information in a piloting instrument such as a gyro horizon type of instrument.

A fundamental indication for the piloting of aircraft, particularly in low external visibility conditions, is attitude which is displayed to the pilot by an instrument called the artificial horizon. The aircraft position in pitch and roll is normally displayed in this instrument by a fixed symbol representing the aircraft wings, behind which a line remains parallel to the horizon and vertical to indicate displacement in roll and pitch movements, respectively. To facilitate piloting at large pitch angles there are in most of the cases, on either side of the main line depicting the horizon, other lines parallel to the main one that can be graduated in pitch angles. Most of the time, for practical use, a manual adjustment permits the displacement of the aircraft symbol either up or down.

Artificial horizons in the beginning were self-contained instruments including a gyroscope slaved to the vertical by a gravity sensing monitoring system called the erector. However, these reliable and very useful instruments are subject to errors inherent in the principle of gyroscopes.

The advent of more sophisticated gyroscopic references, particularly the so-called inertial references, made it possible to obtain an indication of the vertical with a much higher accuracy on board an aircraft. This led to the use of artificial horizons with a conventional display but actuated by servomechanisms reproducing pitch and roll electrical signals furnished by appropriate transducers in the gyroscopic reference. Most of the time these remote indicators also provide other indications for the control of the aircraft and they become sophisticated indicators generally known as "flight directors." These instruments usually have rather large dimensions which permit an increase in the sensitivity of the indications and improve the readability. They are located in a privileged position in front of the pilot, in the middle of the instrument panel. As a counterpart and due to the complexity of the gyroscopic reference, indicator servomechanisms, and electrical connections between the two parts of the equipment, the risks of failure are much higher than with a self-contained artificial horizon.

Also when it happens that an electrical power failure occurs for any of various reasons (a lightning strike for example) this can immediately make the vertical reference system unserviceable.

The above reasons lead to the completion of the aircraft installation with a highly reliable case contained emergency gyroscopic horizon of a moderate price, the most elaborate versions of which display reliable information several minutes after power cut-off, the gyro coasting down. It has been proven in several instances that such an indicator can help in the recovery of an aircraft in difficulty.

As space is usually very limited on instrument panels, an emergency horizon has reduced size and is located somewhat aside. For these two reasons its use, when it becomes necessary, is not always very practical.

SUMMARY OF THE INVENTION

The present invention may be used as a main piloting instrument under normal conditions of use where such an instrument usually has, in principal, large dimensions and great sensitivity, and with the present invention instrument having accuracy furnished by a gyroscopic reference for the pitch and roll information and additionally providing an instrument with emergency operation capability as is found in a self-contained gyroscopic instrument with an integrated erector.

An object of the present invention is for a method and an instrument of less mechanical complexity and avoidance of vertical motions of the aircraft symbol which are liable to interfere with readings because of the offset and because of parallax in relation to the indicator element moved by a vertical gyro.

A further object of the present invention is to combine the outputs from a common vertical gyroscope with a gyroscopic reference such as a gyromaster or other stable platform with a view:

a. to adjusting or compensating the errors of the vertical gyroscope which works in an uninterrupted manner but with the precision of the gyroscopic reference; and b. to letting the vertical gyroscope work as an emergency gyroscope in case of failure of the gyroscopic reference since gyroscopic references with their sophisticated construction are liable to failure.

In one embodiment of the present invention, the aircraft symbol is fed roll corrections and pitch corrections which are made on an indicator drum of the instrument.

BRIEF DESCRIPTION OF THE DRAWINGS

Other objects and advantages of the invention will be apparent from the following description in accordance with the drawings in which.

DESCRIPTION OF THE PREFERRED EMBODIMENT

Figure 1:
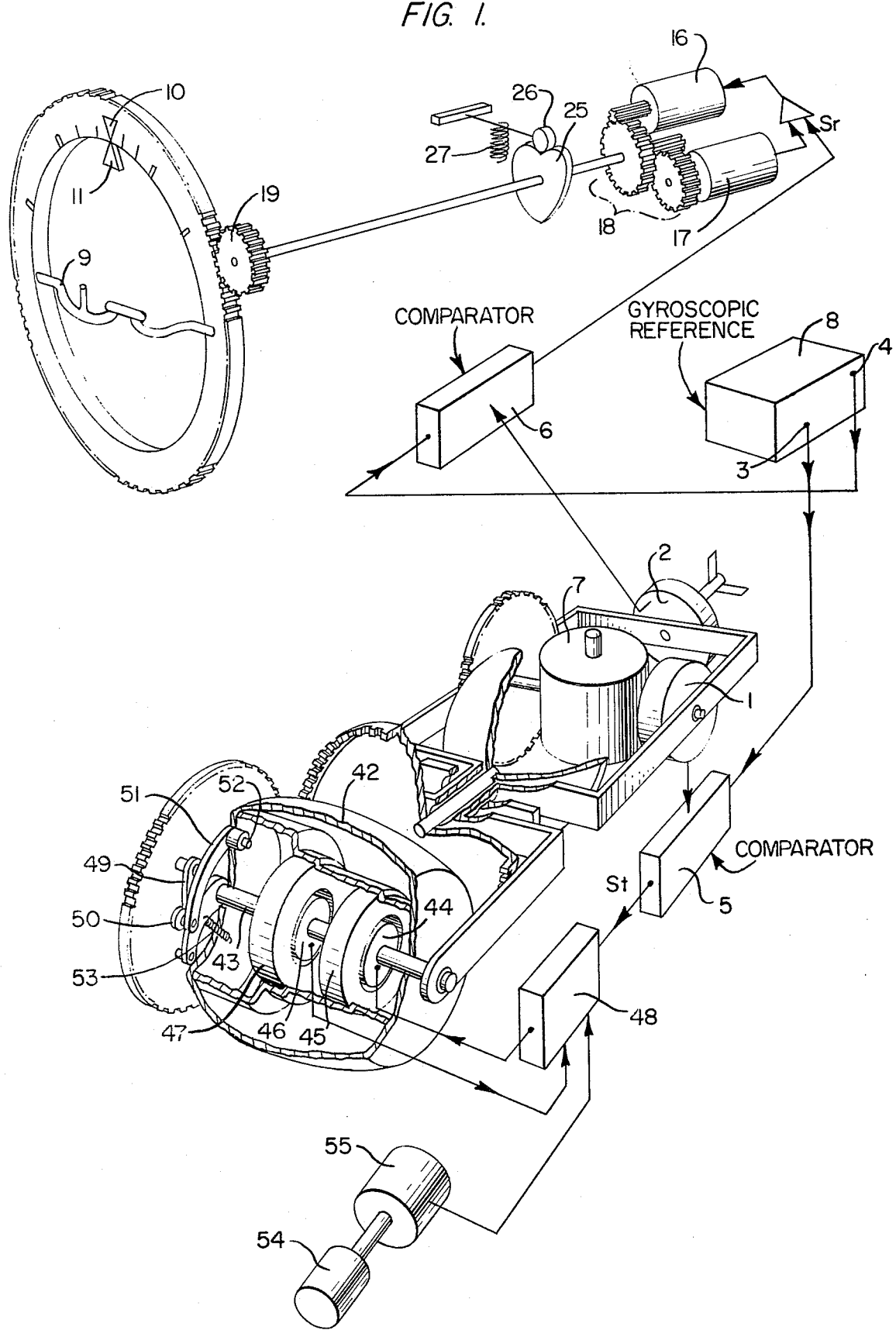
FIG. 1 is a diagrammatic illustration in perspective of an embodiment of the system of the present invention.

The instrument contains the normal type of gyroscope 7 used in an artificial horizon instrument unit. Gyroscope 7 has electrical transducers 1 and 2 which are synchrotransmitters of a known type such as autosynchronous or potentiometric transmitters mounted on its suspension axes. Electrical transducer 1 is mounted on an axis of gyroscope 7 so as to produce an output for changes in pitch while electrical transducer 2 is mounted on a suspension axis of gyroscope 7 so as to produce output for changes in roll of the aircraft. The output pitch signal from electrical transducer 1 is fed to a comparator 5 which also receives a pitch signal output from an electrical transducer in a master gyroscopic reference havin a pitch output 3. In a similar manner, electrical transducer 2 transmits a roll signal to comparator 6 which also receives a roll output signal from an electrical transducer in the gyroscopic reference having a roll output 4.

Comparators 5 and 6 are known devices containing circuitry for comparing two signals wherein the two signals are received and the deviation or error signal is produced at the output of the comparator. The deviation is measured as the deviation from a reference signal 5 which is produced in gyroscopic reference 8. One such gyroscopic reference is manufactured by Lear Incorporated and is referred to as a 2-Gyro Master Reference, Model 2171.

From comparator 6 an output signal Sr corresponding to the roll angular deviation of the instrument's vertical gyroscope 7 with respect to the gyroscopic reference 8 is derived. Signal Sr is fed through an amplifier to roll servo mechanism motor 16 that drives through gear train 18 an electrical detector 17 that delivers the feedback signal back through the amplifier to motor 16. At the same time, motor 16 turns the shaft upon which is mounted a heart-shaped cam 25 on which a roller 26 presses continuously due to the action of spring 27 which also causes an automatic return to a null position in case of power supply cut-off. The power supply cut-off can either be accidental and due to an electrical failure or performed voluntarily, for example, if the pitch and roll angular deviations between the instrument and the gyroscopic reference exceed a preset value. A pinion 19 also mounted to rotate with the shaft upon which the heart-shaped cam 25 is located, rotates in contact with roll dial 10 which may be a toothed ring gear rotatable on rollers which are not shown. Roll dial or ring gear 10 has aircraft symbol 9 mounted and attached thereon for movement therewith and markings on the roll dial which may be used in conjunction with reading index 11 more clearly shown in FIG. 2 as mounted on the suspension of gyroscope 7 which also has an attachment to electrical transducer 2.

Comparator 5 which operates in a manner similar to comparator 6 and which receives signals from electrical transducer 1 for pitch detection of gyroscope 7 and pitch output 3 from an electrical transducer connected with gyroscopic reference 8 has an output signal St which corresponds to the pitch angular deviation of the instrument gyroscope 7 with respect to the gyroscopic reference 8 pitch output 3. Amplifier 48 receives on its input the signal from comparator 5.

Drum 42 is rotatably supported on shaft 43 and is angularly slaved thereto by the servo mechanism which reproduces the angular errors between the gyro platform or reference gyro transducers and the gyro horizon gyroscope 7. The motor of this servo mechanism includes a rotor 44 fixed to shaft 43 and a stator 45 fixed into drum 42. An electrical pick-up which delivers a servo feedback signal includes a rotor 46 fixed to shaft 43 and a stator 47 fixed inside the drum 42. Amplifier 48 which receives its input signal from comparator 5 also receives the signal from its connection to rotor 46 which is the servo feedback pick-up signal. The servo motor rotor 44 is energized by the output from amplifier 48 as is well known per se.

Automatic resetting is provided by a heart-shaped cam 49 connected fast with shaft 43. A follower 50 rides upon cam 49 and is supported by a lever 51 hingedly supported by a pin 52 fixed to indicator drum 42. Pressure of the follower 50 on cam 49 is provided by a spring 53 having one end fastened to lever 51 and the other end to drum 42.

A knob 54 which is ordinarily located on the front face of the artificial horizon instrument allows the introduction of adjustment to the aircraft symbol without movement of the aircraft symbol itself. Upon turning of knob 54, a pick-up 55 transmits a signal into amplifier 48 which in turn affects the signal to rotor 44 and causes an angular motion of the drum 42 in respect to the amount of such signal added to the other inputs to amplifier 48.

Figure 2:
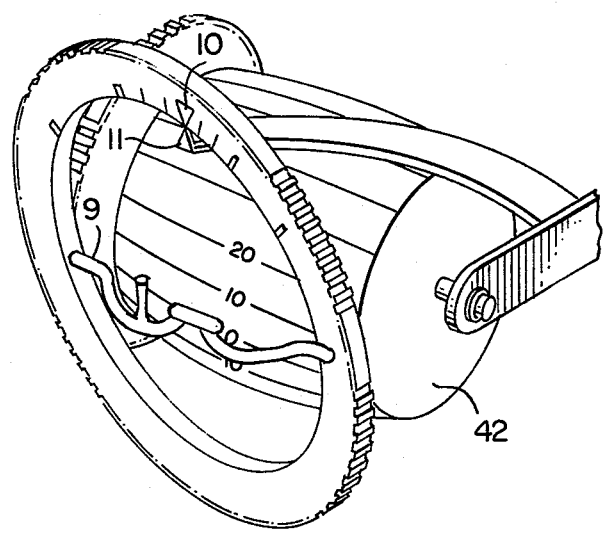
FIG. 2 is a perspective view of the viewed portion of the artificial horizon of the present invention.

FIG. 2 shows the front portion of the artificial horizon instrument with the markings on drum 42 for deviation in pitch and the markings on roll dial 10 for comparison with reading index 11 for deviation in roll. It should be understood that the pitch and roll transmitters used for information transmitted to the artificial horizon can also be used for the supply of this information to other aircraft equipment.

It will be obvious to those skilled in the art that various changes may be made without departing from the scope of the invention and the invention is not to be considered limited to what is shown in the drawings and described in the specification.

What is claimed is:

1. Apparatus for facilitating the piloting of aircraft comprising
    a gyroscopic horizon including a vertical instrument gyroscope with a built-in erector means, and pitch and roll indicator means,
    transducer means to transmit electrical signals proportional to pitch and roll changes attached on the pitch and roll suspension axes of said vertical instrument gyroscope,
    gyroscopic reference means having stable gyroscopic means and pitch and roll electrical transducer means attached to said gyroscopic means,
    first comparator means connected to receive and compare the signals and produce a signal output proportional to the difference in signals from said pitch electrical transducer means of said gyroscopic reference means and said pitch transducer means of said vertical instrument gyroscope,
    second comparator means connected to receive and compare the signals and produce a signal output proportional to the difference in signals from said roll electrical transducer means of said gyroscopic reference means and said roll transducer means of said vertical instrument gyroscope,
    pitch and roll operating means to cause the movement of said pitch and roll indicator means in accordance with said signal outputs from said first and second comparator means.

2. Apparatus in accordance with claim 1, further characterized by
    said pitch and roll indicator means including
        an aircraft symbol mounted on a circular roll scale connected to said roll operating means,
        and an indicator drum connected to said pitch operating means.

3. Apparatus in accordance with claim 2, further characterized by
    said pitch operating means including a servomechanism controlling rotation of said indicator drum.

4. Apparatus in accordance with claim 3, further characterized by
    said servomechanism including
        a shaft driven by said instrument gyroscope to move with its pitch axis,
        a first rotor fixed to said shaft for movement therewith,
        a first stator fixed inside and to said drum;
    and an electrical pick-up means for delivering a servo feedback signal including a second stator fixed to said shaft for movement therewith,
a second stator fixed inside and to said drum.

5. Apparatus in accordance with claim 4, further characterized by
said pitch operating means further including
an amplifier means to receive on its input said signal output from said first comparator means and the servo feedback signal from said electrical pick-up means and producing an output to energize said servomechanism first rotor and stator.

6. Apparatus in accordance with claim 5, further characterized by
manually-operated knob means to cause angular motion of said drum,
and a pick-up mounted to said knob means and connected to apply an additional input signal to said amplifier means.

7. Apparatus in accordance with claim 4, further characterized by
a pitch servomechanism resetting means including
a heart-shaped cam fixed to said shaft,
and a cam follower riding on said cam and mounted in connection to said drum.

8. Apparatus in accordance with claim 1, further characterized by
said roll indicator means including
a roll ring gear bearing a circular roll scale;
a roll servomechanism connected to receive said signal output of said second comparator means and to impart a rotational displacement to said roll ring gear.

9. Apparatus in accordance with claim 8, further characterized by
said roll servomechanism including
a differential,
an electrical detector delivering a feedback signal,
a servoing motor driving said electrical detector, said roll ring gear, and said differential.

10. Apparatus in accordance with claim 9, further characterized by
said roll servomechanism including
return to null positioning means to act in any case of power supply interruption, failure of gyroscopic reference, and angular deviation exceeding a preset value.

11. A method of introducing and indicating pitch and roll information with an artificial horizon instrument of the type having a vertical gyroscope with a built-in erector means which comprises the steps of
obtaining pitch and roll electrical signals from a reference or master gyroscope,
comparing electrical signals furnished by transducers mounted on the pitch and roll suspension axes of said vertical gyroscope to said respective pitch and roll electrical signals from said reference or master gyroscope,
applying pitch and roll angular deviation signals obtained from said comparing of signals to pitch and roll indications displayed by said instrument.

12. The method in accordance with claim 11, further characterized by
said pitch angular deviation signal is applied to an indicator drum
and said roll angular deviation signal is applied to an aircraft symbol mounted in front of said drum.

13. The method in accordance with claim 11, further characterized by
at least said roll angular deviation signal is applied to move an aircraft symbol mounted in the front portion of said artificial horizon instrument.

* * * * *